W. B. LASHAR & T. C. LUCE.
ANTIFRICTION BEARING.
APPLICATION FILED MAY 22, 1915.

1,153,868.

Patented Sept. 14, 1915.

Witnesses:
Charles Eberhart
Jessie B. Kay

Inventors
Walter B Lashar
Thomas C Luce
By their Attorney
Harry L Duncan

UNITED STATES PATENT OFFICE.

WALTER B. LASHAR, OF BRIDGEPORT, AND THOMAS C. LUCE, OF STRATFORD, CONNECTICUT.

ANTIFRICTION-BEARING.

1,153,868.  Specification of Letters Patent.  Patented Sept. 14, 1915.

Application filed May 22, 1915.   Serial No. 29,724.

*To all whom it may concern:*

Be it known that we, WALTER B. LASHAR, of Bridgeport, Fairfield county, Connecticut, and THOMAS C. LUCE, of Stratford, Fairfield county, Connecticut, have made a certain new and useful Invention Relating to Antifriction-Bearings, of which the following is a specification, taken in connection with the accompanying drawing, which forms part of the same.

This invention relates especially to antifriction bearings in which a series of inclined bearing disks or members are mounted within a race having an inclined race guide and inclined bearing track with which coöperate the bearing surfaces of the rolls which may be conical, the bearing rolls preferably having central depressions in their outer faces which are given a convex form to coöperate with the race guide to best advantage and if desired rejecting retainers or hubs may be formed on the inner faces of these bearing members so that they are held loosely in position in the race by a suitable retainer coöperating therewith.

Figure 1:
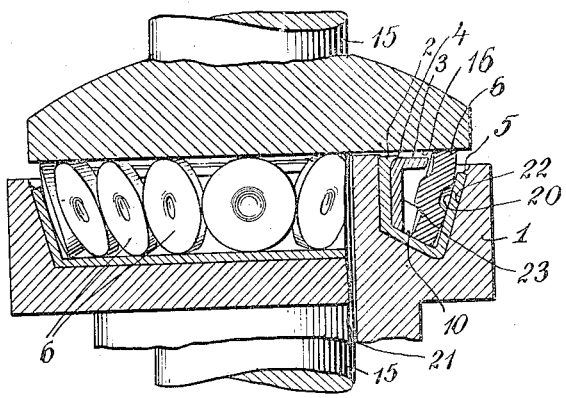
Figure 2:
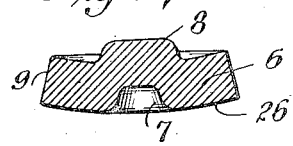
Figure 3:
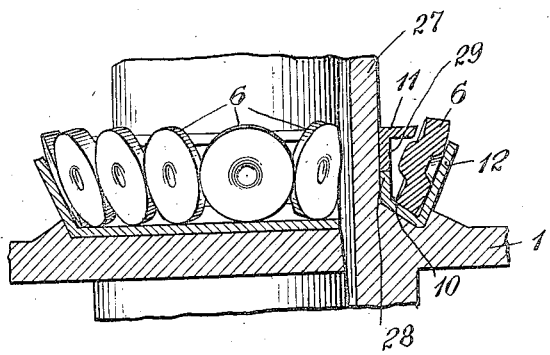
Figure 4:
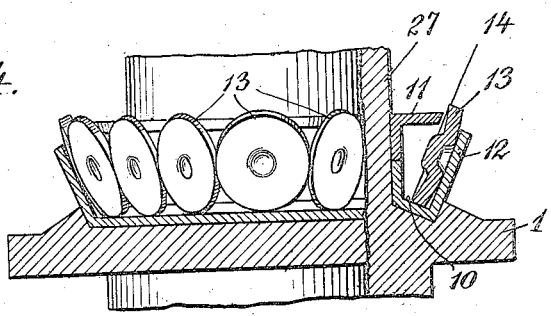

In the accompanying drawings showing in a somewhat diagrammatic way illustrative embodiments of this invention, Figure 1 is a vertical section through one form of bearing. Fig. 2 is an enlarged section through one of the bearing rolls or members. Fig. 3 is a vertical section through another form of bearing; and Fig. 4 is a similar view of a still further modification.

The bearing preferably comprises a race which may be conveniently stamped up or otherwise formed of sheet metal preferably of special steel which may be of a self-hardening variety when the race is to be cast into the coöperating support in which it is mounted. The race member or race may as indicated in Fig. 1 comprise the conical race guide 20 and the coöperating conical bearing track 10 which may if desired be integral therewith and which forms the principal bearing surface with which the bearing rolls or members 6 coöperate. It is also desirable to provide the race with an integral race sleeve, such as 2, which may be substantially cylindrical and extend up within the race guide as indicated.

The bearing disks or members 6 may as indicated in Figs. 1 and 2 be formed with the somewhat convex outer faces 26 engaging the inclined or conical race guide so as to be held in proper alinement as they move around the race and if desired an inwardly projecting retainer or hub 8 of any suitable size may be formed on these bearing members as by stamping them out of suitable sheet metal, such, for instance as special steel, a single operation thus stamping out the disks and forming thereon the retainer or hub 8 and the recess 7 and also giving the bearing disks the desired convex outer faces 26. The disks may then be finished in any suitable machine in which the bearing surfaces are trued and finally finished as by grinding which enables this finishing operation to be done after the disks have been hardened and tempered in any suitable way. The bearing disks may be retained in proper coöperation with the race by any suitable means, as for instance by a retainer member which may comprise the retainer flange 3 and connected retainer sleeve 23 which may for instance fit within the race sleeve 2 and be permanently held in service position therein by the flanged-over portion or detent 4. The bearing rolls are thus securely held in service position and allowed to have free movement around the race and ample opportunity for self-adjustment to accommodate such slight irregularities as may be occasioned by the shape of the parts or the irregular loading of the device. In some cases it is desirable to have the bearing disks or rolls formed with conical bearing surfaces 26 as indicated in Figs. 1 and 2 which especially with rather thick bearing disks minimizes the friction between their bearing surfaces and the bearing track and coöperating bearing collar 16, for instance, on the shaft 15 which may extend through a hole 21 in the support 1 in which the race is mounted. The bearing rolls may thus have practically pure rolling contact with these coöperating surfaces when the angles of the race and bearing rolls are properly arranged and the inclined position of the bearing rolls also exerts a self-alining action on the bearing members.

The bearing comprising the race and retainer and bearing rolls may thus be assembled previous to being mounted in any suitable way and if desired the race may be permanently mounted in the supporting member, such as the support 1, by casting it into this member as by embedding the race in the mold so that it is more or less surrounded and embedded in the malleable iron or other material, of which the supporting member is formed. For this purpose it is desirable to have the race made of special steel of self-hardening properties and formed of sufficient thickness and stiffness to prevent undesirable distortion during the casting operation which may also form suitable detents 5 overlapping the upper edge of the race guide, for instance so as to positively prevent its withdrawal from the support. If desired, however, the support may be formed in other ways with a socket 22 of such shape as to properly accommodate the race which may then be forced into the socket and held in position as by forcing down upon it detent portions, such as 5, which prevent its withdrawal from the socket.

Fig. 3 shows still another form of construction in which the race guide 12 and bearing track 10 may be cast into the support 1, together with the upstanding portion 28 of the race member which may as indicated be given a substantially cylindrical form. In this instance the support may be formed with an internal support sleeve 27 to promote the alinement of the bearing members and the retainer flange may in this instance have an integral retainer sleeve 29 formed upon it of such size as to be forced down over the support sleeve and retain it in position in this way so as to loosely hold the bearing rolls or members 6 in service position.

Fig. 4 shows still another modification in which the race may be cast into the support 1 in a similar way and the retainer 11 is similarly mounted on the support sleeve 27. The bearing rolls 13 are in this case shown as being considerably thinner and as having substantially cylindrical bearing surfaces 14 coöperating with the bearing track 10 and with the coöperating member of the bearing which would thus have a conical bearing surface substantially parallel to this track. The inclined position of the bearing rolls would thus in this instance have a still more pronounced self-alining action so as to hold the two bearing members in substantial alinement during their relative rotation.

This invention has been described in connection with a number of illustrative embodiments, forms, proportions, materials, arrangements and numbers of parts, to the details of which disclosure the invention is not of course to be limited, since

What is claimed as new and what is desired to be secured by Letters Patent is set forth in the appended claims.

1. In anti-friction bearings, a sheet steel race comprising a conical race guide and an integral conical bearing track and a substantially cylindrical race sleeve extending upward within said race guide, a series of inclined bearing disks coöperating with said race and each having an outer face provided with a central recess and with a convex surface engaging the conical race guide and having a central projecting retainer hub on its inner face and having conical bearing surfaces coöperating with said bearing track, a retainer sleeve permanently held within said race sleeve and having an integral retainer flange loosely coöperating with said retainer hubs to hold said bearing disks in service position and a support formed with a cast in socket within which said race is permanently secured.

2. In anti-friction bearings, a race comprising a conical race guide and an integral conical bearing track and a substantially cylindrical race sleeve extending upward within said race guide, a series of inclined bearing disks coöperating with said race and each having an outer face provided with a convex surface engaging the conical race guide and having a central projecting retainer hub on its inner face and having bearing surfaces coöperating with said bearing track, a retainer sleeve permanently held within said race sleeve and having an integral retainer flange loosely coöperating with said retainer hubs to hold said bearing disks in service position and a support formed with a cast in socket within which said race is permanently secured.

3. In anti-friction bearings, a race comprising a conical race guide and an integral conical bearing track and a race sleeve extending upward within said race guide, a series of inclined bearing disks coöperating with said race and each having an outer face provided with a convex surface engaging the conical race guide and having a central projecting retainer hub on its inner face and having bearing surfaces coöperating with said bearing track and a retainer sleeve permanently held within said race sleeve and having an integral retainer flange loosely coöperating with said retainer hubs to hold said bearing disks in service position.

4. In anti-friction bearings, a sheet metal race comprising a conical race guide and an integral conical bearing track and a race sleeve extending upward within said race guide, a series of inclined bearing disks coöperating with said race and each having a convex outer surface engaging the conical race guide, a central projecting retainer hub on its inner face and having conical bearing surfaces coöperating with said bearing track and a retainer sleeve permanently secured by said race sleeve and having an integral retainer flange loosely coöperating with said retainer hubs to hold said bearing disks in service position.

5. In anti-friction bearings, a race comprising a conical race guide and a conical bearing track and a race sleeve extending upward within said race guide, a series of inclined bearing disks coöperating with said race and each having a convex outer surface engaging the conical race guide, a central projecting retainer hub on its inner face and having bearing surfaces coöperating with said bearing track and a retainer permanently secured by said race sleeve and having a retainer flange loosely coöperating with said retainer hubs to hold said bearing disks in service position.

6. In anti-friction bearings, a race comprising a conical race guide and conical bearing track, a series of inclined bearing disks coöperating with said race and each having a convex outer surface engaging the conical race guide, a central projecting retainer hub on its inner face and having bearing surfaces coöperating with said bearing track and a retainer loosely coöperating with said retainer hubs to hold said bearing disks in service position.

7. In anti-friction bearings, a race comprising a conical race guide and a conical bearing track, a series of inclined bearing disks coöperating with said race and each formed with an outer face provided with a central recess and with a convex surface engaging the conical race guide to be held in alinement thereby and having a central projecting retainer hub on its inner face and having conical bearing surfaces coöperating with said bearing track to have a self alining action on the coöperating bearing member and a retainer permanently secured to said race and loosely coöperating with said retainer hubs to hold said bearing disks in service position.

8. In anti-friction bearings, a race comprising a conical race guide and a conical bearing track, a series of inclined bearing disks coöperating with said race and each formed with an outer face provided with a convex surface engaging the conical race guide to be held in alinement thereby and having a central projecting retainer hub on its inner face and having bearing surfaces coöperating with said bearing track to have a self-alining action on the coöperating bearing member and a retainer loosely coöperating with said retainer hubs to hold said bearing disks in service position.

9. In anti-friction bearings, a race comprising a conical race guide and a conical bearing track, a series of inclined bearing disks coöperating with said race and each formed with an outer face provided with a convex surface engaging the conical race guide to be held in alinement thereby and having bearing surfaces coöperating with said bearing track to have a self-alining action on the coöperating bearing member and a retainer to hold said bearing disks in service position.

WALTER B. LASHAR.
THOMAS C. LUCE.

Witnesses:
 Wm. C. Ettershank,
 W. M. Wheeler,
 Benjamin Lewis,
 Wm. Siegler.